(12) United States Patent
Ehrlich et al.

(10) Patent No.: US 11,555,670 B2
(45) Date of Patent: Jan. 17, 2023

(54) FOLDABLE MAN-PORTABLE REMOTE-CONTROLLED LIGHT-WEAPON STATION

(71) Applicant: SMART SHOOTER LTD., Kibbutz Yagur (IL)

(72) Inventors: Avshalom Ehrlich, Kibbutz Ramat Hashofet (IL); Tzach Arnon, Yodfat (IL); Afik Shoham, Tirat Carmel (IL)

(73) Assignee: SMART SHOOTER LTD., Kibbutz Yagur (IL)

( * ) Notice: Subject to any disclaimer, the term of this patent is extended or adjusted under 35 U.S.C. 154(b) by 28 days.

(21) Appl. No.: 17/361,442

(22) Filed: Jun. 29, 2021

(65) Prior Publication Data

US 2022/0205754 A1  Jun. 30, 2022

Related U.S. Application Data

(60) Provisional application No. 63/132,571, filed on Dec. 31, 2020.

(51) Int. Cl.
| | |
|---|---|
| *F41A 23/14* | (2006.01) |
| *F41G 3/02* | (2006.01) |
| *G06T 7/20* | (2017.01) |
| *F41A 17/08* | (2006.01) |
| *F41A 23/24* | (2006.01) |
| *F41G 5/06* | (2006.01) |

(52) U.S. Cl.
CPC ............... *F41G 3/02* (2013.01); *F41A 17/08* (2013.01); *F41A 23/14* (2013.01); *F41A 23/24* (2013.01); *F41G 5/06* (2013.01); *G06T 7/20* (2013.01)

(58) Field of Classification Search
CPC ..... F41G 3/00; F41G 3/02; F41G 3/30; F41G 5/06; F41G 11/07; F41A 23/14; F41A 27/00; G02B 23/2476
See application file for complete search history.

(56) References Cited

U.S. PATENT DOCUMENTS

| | | | | |
|---|---|---|---|---|
| 8,549,786 | B1 * | 10/2013 | Griffith | F41A 23/14 |
| | | | | 42/94 |
| 10,584,935 | B1 * | 3/2020 | Afshari | F41A 23/005 |
| 2011/0042459 | A1 * | 2/2011 | Sullivan | F41G 5/06 |
| | | | | 235/407 |
| 2012/0273631 | A1 * | 11/2012 | Deros | F16M 11/32 |
| | | | | 248/122.1 |
| 2016/0086346 | A1 * | 3/2016 | Levilly | B25J 11/002 |
| | | | | 382/103 |
| 2022/0205762 | A1 * | 6/2022 | Ehrlich | F41A 23/24 |

* cited by examiner

*Primary Examiner* — J. Woodrow Eldred
(74) *Attorney, Agent, or Firm* — Mark M. Friedman

(57) ABSTRACT

A foldable support for aiming an aimable device, including: (a) a coupling arrangement adapted to releasably couple the aimable device thereto; (b) a foldable leg mechanically coupled to the coupling arrangement; (c) two linear actuators adapted to be angularly spaced apart, the two linear actuators adjustably coupled to the coupling arrangement; and (d) a collapsible reinforcement frame selectively providing rigid interconnection between bases of each of the two linear actuators and the foldable leg, and collapsible to provide a compact portable form of the support.

20 Claims, 11 Drawing Sheets

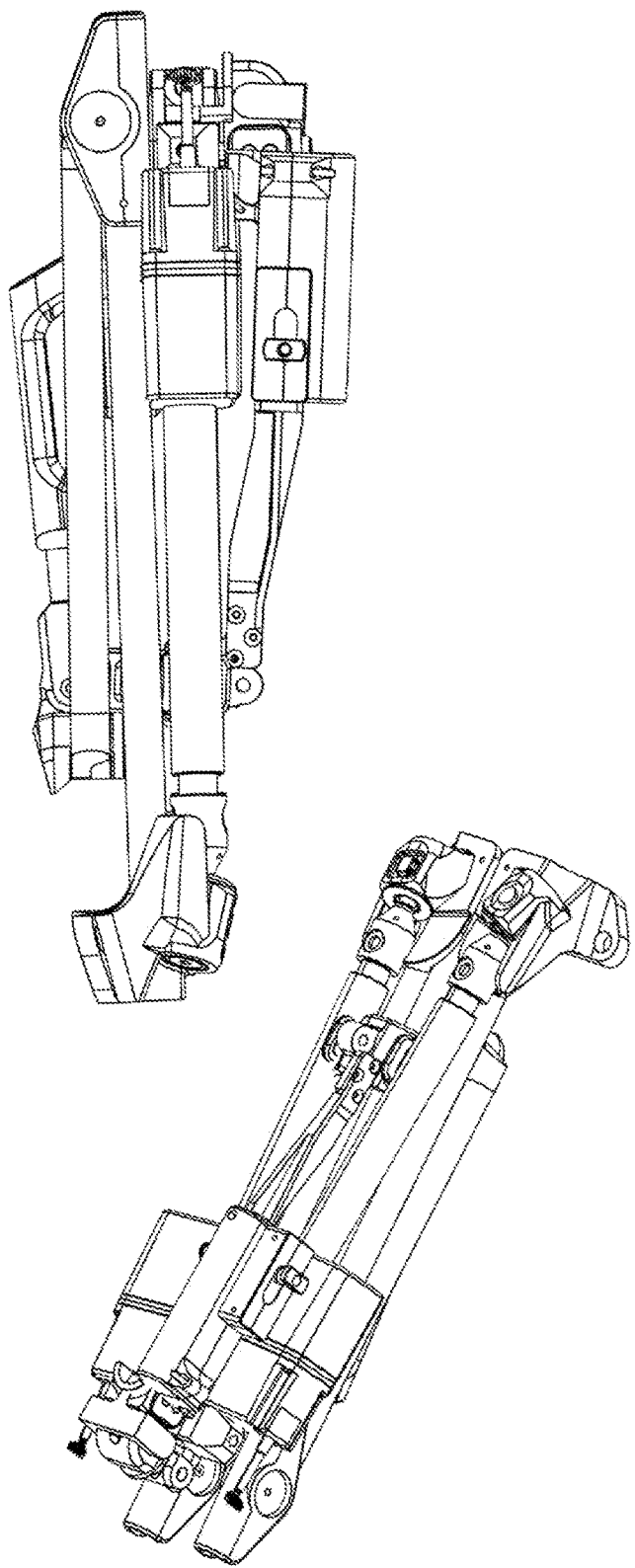
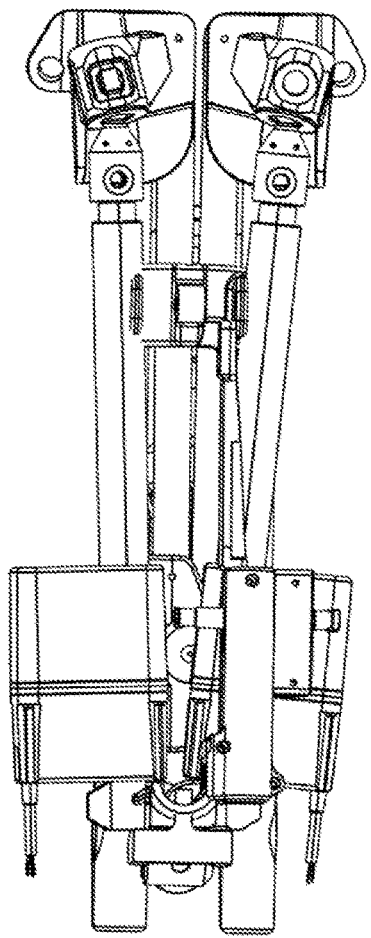
FIG. 6B
FIG. 6C
FIG. 6A

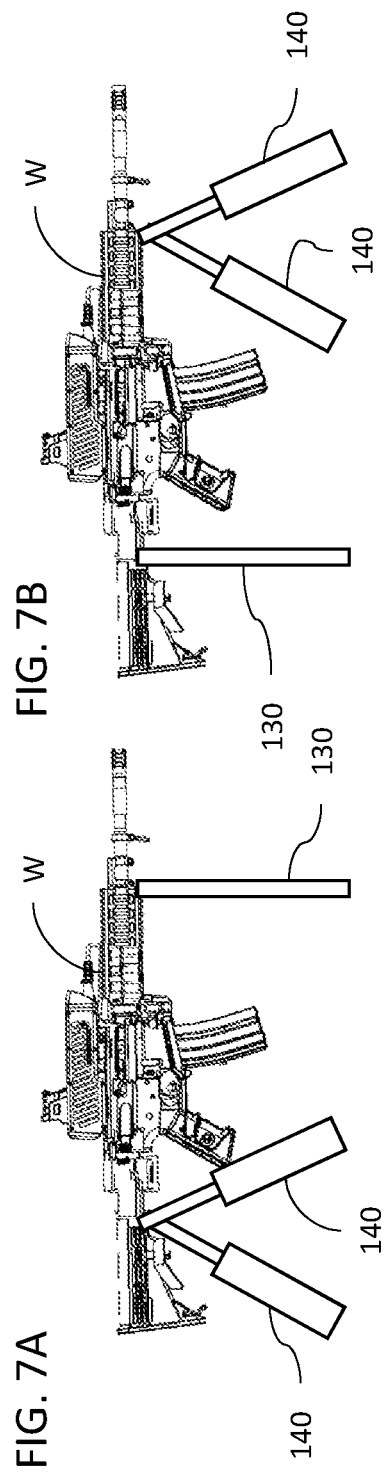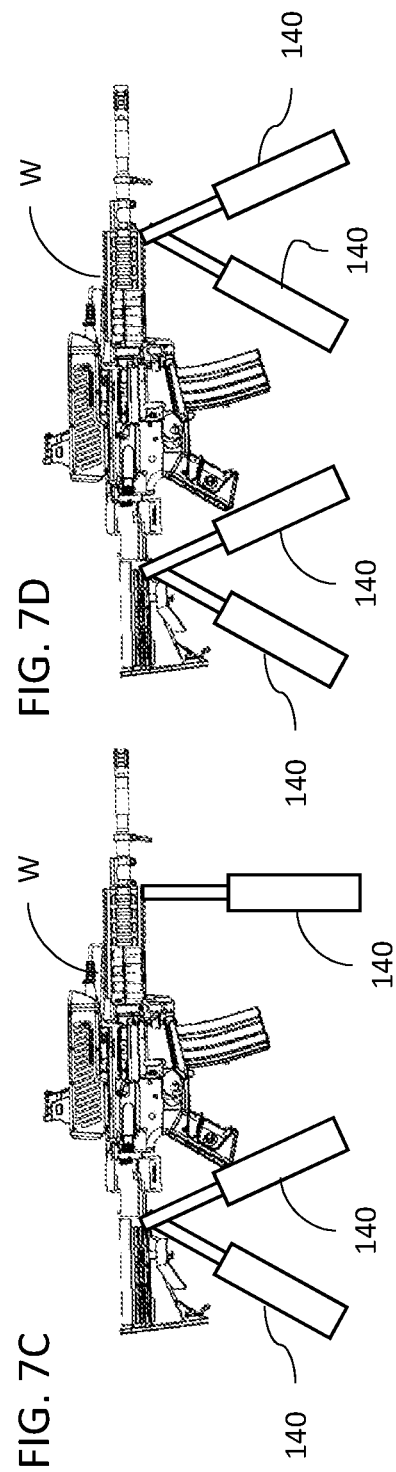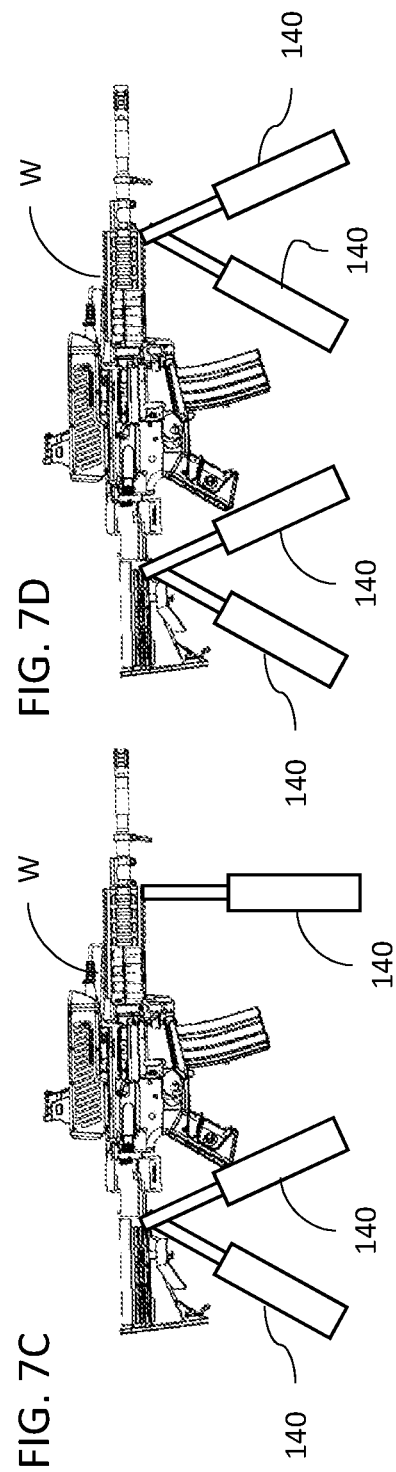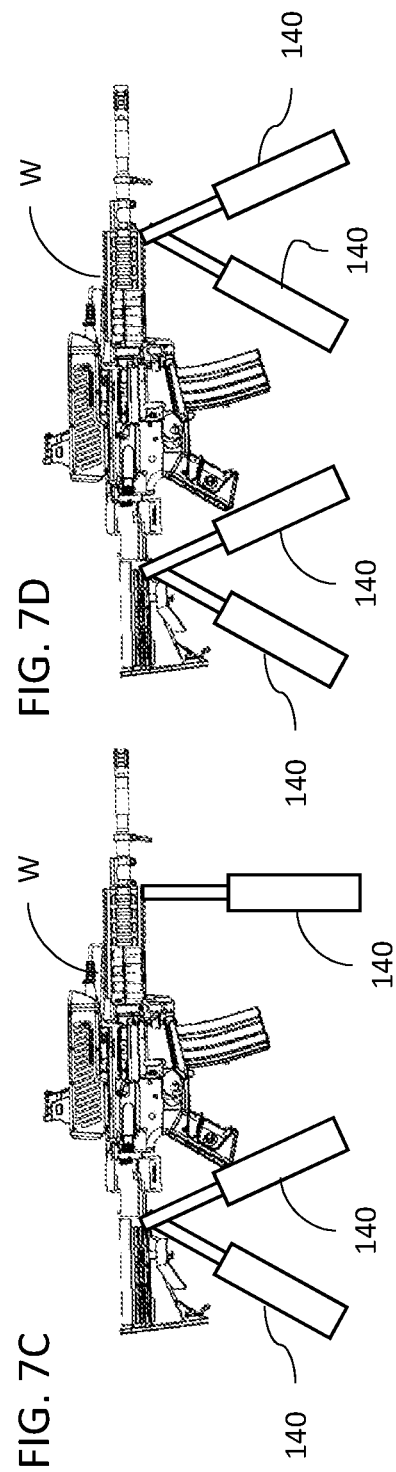

FOLDABLE MAN-PORTABLE REMOTE-CONTROLLED LIGHT-WEAPON STATION

FIELD OF THE INVENTION

The present invention relates to a weapons support, and, more particularly, to a remote-controlled weapon support for a handheld, small arms and light weapons (SALW) with a mounted fire control system. The present invention also relates to remote controlled weapons systems.

BACKGROUND OF THE INVENTION

A fire control system integrated with a weapon sight for small arms and light weapons (SALW) is disclosed by Ehrlich in U.S. Pat. No. 10,097,764 which is incorporated in its entirety as if fully set forth herein.

SUMMARY OF THE INVENTION

According to the present invention there is provided a foldable support for aiming an aimable device, including: (a) a coupling arrangement adapted to releasably couple the aimable device thereto; (b) a foldable leg mechanically coupled to the coupling arrangement; (c) two linear actuators adapted to be angularly spaced apart, the two linear actuators adjustably coupled to the coupling arrangement; and (d) a collapsible reinforcement frame selectively providing rigid interconnection between bases of each of the two linear actuators and the foldable leg, and collapsible to provide a compact portable form of the support.

According to further features in preferred embodiments of the invention described below the collapsible reinforcement frame includes two rods each running from a respective base of each of the two linear actuators to the folding leg, the two rods being axially coupled to the foldable leg; wherein each of the two rods includes a respective hinge for folding the two rods to provide the compact portable form.

According to still further features in the described preferred embodiments the aimable device is mounted on the support and wherein the aimable device is suitable for both handheld and mounted operation without modification to the aimable device between the handheld and the mounted operation.

According to still further features the support further includes an actuation mechanism for actuating the aimable device. According to still further features the aimable device is a weapon and the weapon is mounted on the support and wherein the actuation mechanism is a trigger pulling device. According to still further features the trigger-pulling device is configured to be actuated according to output from a fire control system mounted on/collocated with the weapon.

According to still further features the aimable device includes or is mounted/collocated with an imaging sensor and in communication with a remote controller and wherein the actuation mechanism is configured to be remotely actuated by the remote controller.

According to still further features the actuation mechanism is adapted to be actuated according to output from a fire control system mounted on/collocated with the aimable device. According to still further features the support is in communication with a remote controller and wherein the actuation mechanism is configured to be remotely actuated based on commands from the remote controller.

According to still further features the actuation mechanism is selectively controlled according to a mode selected from the group including: (i) a direct mode based on output from the remote controller to the actuation mechanism immediately actuates the actuation mechanism, (ii) a lock-on-fire mode wherein the output from the remote controller instructs the fire control system to lock onto a selected target and actuate the actuation mechanism when a firing solution is achieved, (iii) a lock-on-track mode wherein the output from the remote controller instructs the fire control system to lock onto a selected target and actuate the actuation mechanism when a subsequent firing command has been received and the firing solution has been achieved, and (iv) an autonomous mode wherein the output from the fire control system autonomously controls the actuation mechanism.

According to still further features the linear actuators are adapted to be actuated according to output from a remote controller in communication with the support.

According to still further features the aimable device is mounted on the support and wherein the linear actuators are adapted to be actuated according to output from a fire control system mounted on/collocated with the aimable device and in communication with the linear actuators.

According to still further features the wherein the linear actuators are adapted to be selectively actuated according to the output from at least one of: the fire control system and a remote controller in communication with the support.

According to still further features the support further includes an integrated image sensor in the support.

According to still further features the coupling arrangement includes first and second attachment configurations for engaging two spaced-apart locations on the aimable device. According to still further features the folding leg includes is a third linear actuator.

According to still further features the support further including a fourth linear actuator, wherein the two actuators are adjustably coupled to a first location on the coupling arrangement and the third and fourth linear actuators are adjustably coupled to a second location on the coupling arrangement.

According to still further features the support further includes a fire control system integrated in the support.

According to another embodiment there is provided a collapsible support system, including: an aimable device [permanently coupled to the body of the support structure]; a foldable leg is coupled to a first location on the aimable device; two linear actuators adapted to be angularly spaced apart and adjustably coupled to a second location on the aimable device; and a collapsible reinforcement frame selectively providing rigid interconnection between bases of each of the two linear actuators and the foldable leg, and collapsible to provide a compact portable form of the support system.

BRIEF DESCRIPTION OF THE DRAWINGS

Various embodiments are herein described, by way of example only, with reference to the accompanying drawings, wherein:

FIGS. 6A, 6B and 6C depict various views the support of FIGS. 2-5 in a compact portable form;

FIGS. 7A-7D are schematic diagrams showing four configurations, without details of the collapsible frame and other components.

DESCRIPTION OF THE PREFERRED EMBODIMENTS

By way of general introduction, the present document is directed to a support for an aimable device. The support has an open state for use and a collapsed state for transporting the support from place to place (e.g., strapped to a rucksack and carried on a person's back). The support has a stable frame as well as moving parts that move the aimable device that is on the support. The specific examples and embodiments discussed below deal, by and large, with a support for a weapon. However, it is made clear at the outset that any reference to a weapon, where applicable, refers likewise, mutatis mutandis, to any aimable device whether passive (e.g., camera, binoculars etc.) or active (e.g., laser rangefinder, laser marker etc.).

The terms small arms, light weapons, firearms, handheld firearms, similar terms and variations thereof are used herein interchangeably to refer to any man-portable lethal weapon designed for individual use that expels or launches, is designed to expel or launch, or may be readily converted to expel or launch a shot, bullet or projectile by any action such as the action of an explosive. As used herein, the definition is expanded to non-lethal weapons as well as weapons that do not discharge a projectile, such as an energy weapon. Additionally, or alternatively, any of the aforementioned terms can refer to a dedicated weapon that is not intended to be handheld and/or may not be designed for handling by a person.

Furthermore, the instant support, whether remote controlled, partially autonomous and/or completely autonomous, is adapted to support not only a weapon, but indeed any aimable device. Therefore, even though the following description is related to a support for a weapon, it is made clear that the embodiments and configurations discussed are equally intended to relate to any aimable device. Examples of aimable devices that are not weapons per se include, but are in no way limited to, surveillance equipment, laser pointers, laser range finders, etc. In preferred embodiments, the aimable device is suitable for both handheld and mounted operation without modification to the aimable device between the two modes of operation. The principles and operation of a foldable, remotely controllable support for an aimable device such as, but not limited to, a weapon, according to the present invention may be better understood with reference to the drawings and the accompanying description.

Figure 1:
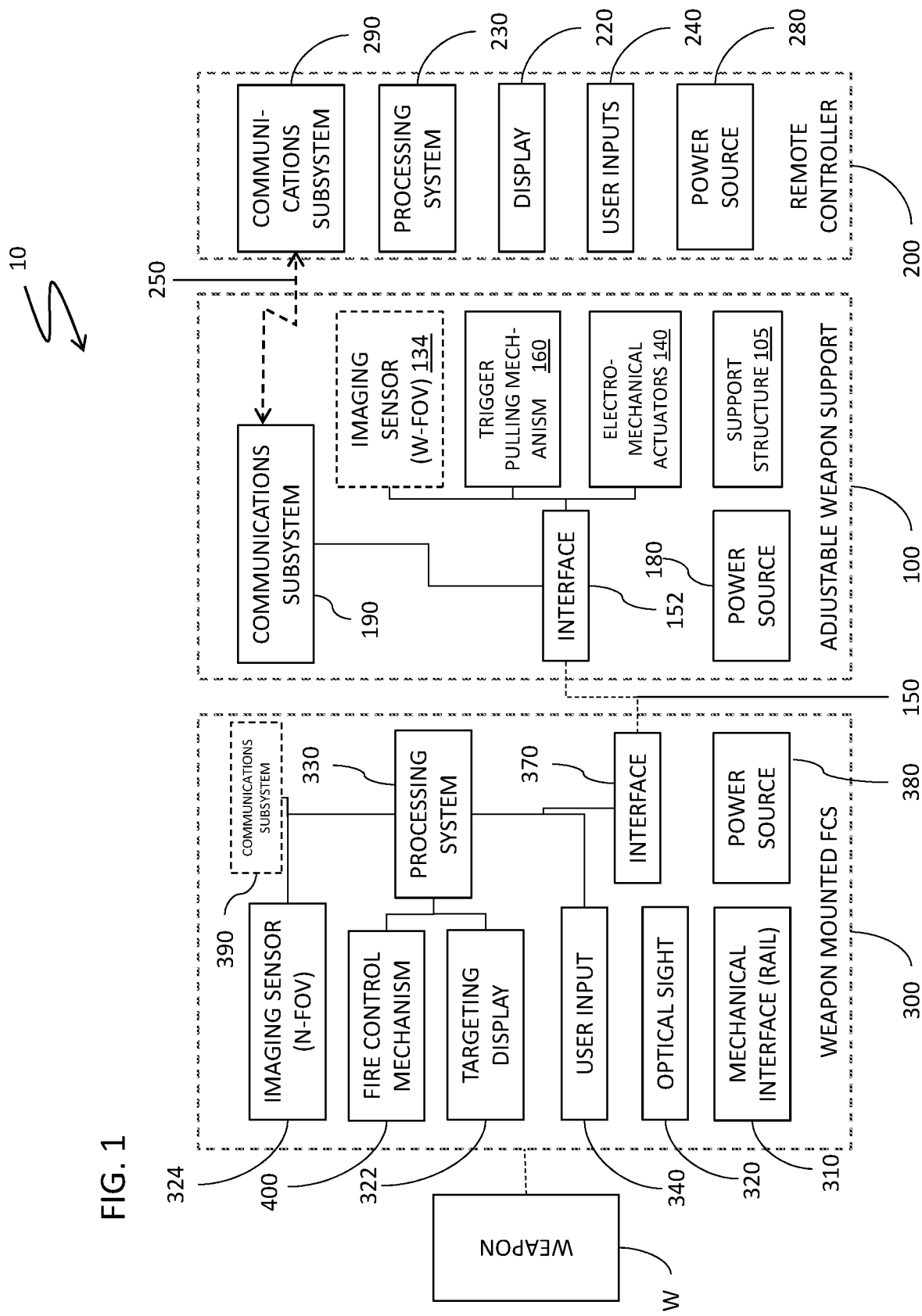
FIG. 1 is a block diagram of the remote-controlled weapons system (RCWS)

Referring now to the drawings, FIG. 1 illustrates a block diagram of the remote-controlled weapons system (RCWS) 10. The RCWS includes an adjustable weapon support 100, a remote controller 200 and a weapon-mounted FCS 300.

The weapon mounted FCS 300 is mounted on a weapon W. In embodiments that provide an "assisted shot" feature (a mode which facilitates the weapon discharging the bullet at a precise time, see below for further details), weapon W includes a modified grip with an integrated Fire Control Mechanism (FCM) 400 that controls (i.e., allows or prevents) actuation of the trigger mechanism of the weapon. The term 'trigger mechanism', as used herein, does not only refer to an actual firearm trigger but rather to any mechanical, electrical and/or electromechanical mechanism that actuates firing of the weapon or actuation/activation of the aimable device. The FCM is in communication with the FCS. The FCM is an optional feature in the RCWS 10.

In preferred embodiments, the FCS is integrated into a sight module which is mounted on the weapon W by attaching and affixing a mechanical interface 310 to the Picatinny rail (or other relevant structure) of the weapon. The weapon mounted module is either referred to as the sight module or FCS 300. The FCS 300 depicted in the drawings includes an optical sight 320 which is a see-through aiming optic. This type of sight is merely exemplary and not intended to be limiting in any way. The optic includes a micro-display which is a targeting display 322 that augments the real-world scene as viewed through the see-through optics. The micro-display can also display video. The FCS includes an imaging sensor 324. Imagery captured by the imaging sensor 324 is processed by a processing system 330. The processing system provides outputs to the targeting display 322. The targeting displays aids the operator in hitting their target. The operator interfaces with the FCS (e.g., to select a target to fire on) via a User Input interface 340. The user input interface may be a button or some other type of user control. The user control may be positioned near the barrel handguard or grip so that it can be actuated by firearm operator without removing their hands from the firearm (which is usually held in a two-handed grip, one hand on the handle and the other hand under the handguard).

The System Processor 330 also handles all the processing related to detecting, tracking, calculating a firing solution, actuating the FCM and/or the trigger pulling mechanism. The FCS has a power source 380 (e.g., a rechargeable battery) and an interface 370 for interfacing with the adjustable support 100. A cable (e.g., plugging cable 150) connects the interface 370 of the FCS to the interface 152 of remote-controlled weapon support 100. Additionally, or alternatively, the FCS may include a communications subsystem 390, allowing communication directly between the FCS and the support 100 without the need for a cable. In some embodiments, optional communications subsystem 390 additionally, or alternatively, allows direct communication between the FCS and the remote controller.

It is made clear that system processing can take place in any of the hardware components (sight module, support structure, remote console) or can be shared between processors in two or more components. Alternatively, or additionally, processing can take place in a remote location and/or in a cloud. Any configuration that facilitates processing is considered to be within the scope of the invention. In a similar fashion, there may be more than one power source, or a single power source may provide power to more than one component. Again, any configuration for power distribution between the various components is considered to be within the scope of the invention.

Further, the innovative collapsible support (that will be discussed in greater detail below) includes a trigger pulling mechanism that is adapted to control the pulling action of the trigger of the mounted device. The innovative system is in communication (in a wired and/or wireless manner, e.g., via wired and/or wireless communication subsystems 190 or 390 and 290) with a remote-control console that controls various aspects of the collapsible support and trigger-pulling mechanism.

It is made clear that the 'trigger-pulling mechanism' is one preferred embodiment of an actuation mechanism that actuated the aimable device of the support. Where the aimable device is weapon with a trigger, the actuation mechanism is a trigger pulling mechanism. Where the aimable device is actuated by other means, such a pressing a button or sending a signal, the actuation mechanism is a button pushing mechanism or signal sending mechanism. Accordingly, wherever the term 'trigger-pulling mechanism' is used, it is to be understood as relating to a specific embodiment of an actuation mechanism and where applicable, refers likewise, mutatis mutandis, to any actuation mechanism for a corresponding aimable device.

The remote control may be connected to the support or to the weapon-mounted FCS Likewise, the FCS may be connected to the support in a wired manner or a wireless manner. The remote control may be in wireless communication with one of the components, for example the FCS, and the FCS itself may be in wired communication with the other component, e.g., the support. That is to say that the various connections may be all wired or all wireless or some combination of both wired and wireless.

In preferred embodiments, the Fire Control System is configured to autonomously control the collapsible support. Autonomously controlling the weapon support includes, for example, controlling movement of the actuators and firing of the weapon. There may be different levels of autonomous control, such as partial control after an operator has selected a target (also referred to as lock-on-fire or lock-on-track modes, depending on whether the FCS only tracks or both tracks and fires on the selected target without addition commands) or full control based on detecting, recognizing, and/or identifying of targets and then tracking of a locked-on target and acquiring a firing solution. The fully autonomous mode is discussed in further detail below. Most preferably, the FCS is embodied in a specialized weapon sight that is mounted on the weapon and in electrical communication with the collapsible support and the remote console.

In some embodiments of the support, the FCS is integrated into the support itself. In such embodiments, any aimable device attached to the support can benefit from the functionality of the FCS. In integrated FCS has all the functionality of a connected FCS discussed elsewhere herein.

In other embodiments, the RCWS may be completely autonomous with preprogramed operational parameters. For example, the portable weapon support 100 may be configured to be an autonomous, remote weapon system. The FCS can be programmed to detect, recognize and/or identify potential targets and if a target is detected, recognized and/or identified, the FCS locks onto the target, tracks it and fires the munition once a firing solution has been achieved. All this may be without any intervention via the remote controller. Such autonomous operation may be initiated by a command from a remote controller, or may be initiated locally by an operator, without use of a remote controller. Of course, this does not detract from the option of employing other features of the FCS, such as sending imagery and/or other information from the FCS to the controller 200.

Figure 1A:
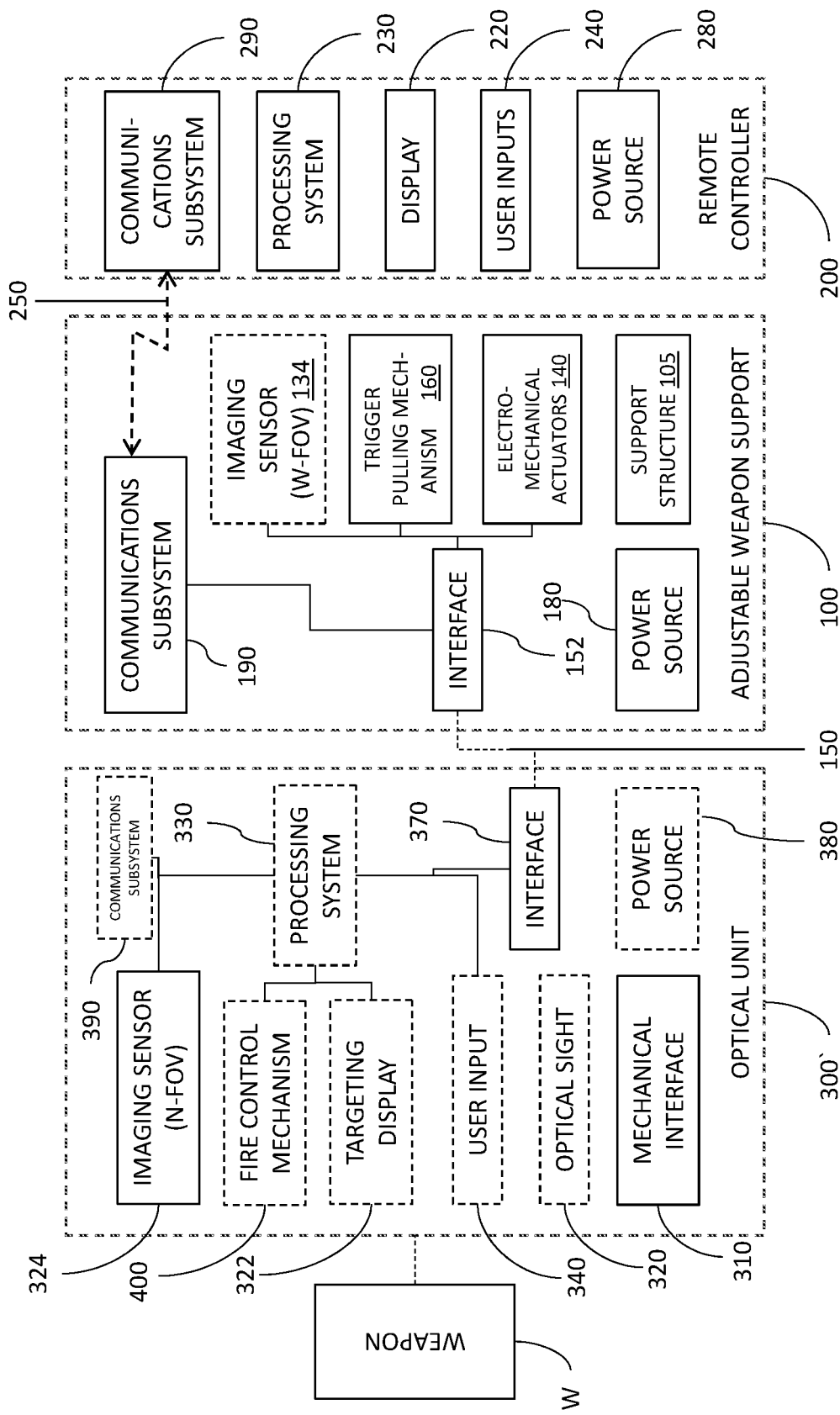
FIG. 1A is a block diagram of another embodiment of the RCWS which may or may not have an FCS.

FIG. 1A illustrates another embodiment of the RCWS which may or may not have an FCS. RCWS 10' depicted in FIG. 1A is substantially similar to RCWS 10 with the exception of the weapon mounted FCS. RCWS 10' has the same adjustable weapon support 100 and remote control 200. However, instead of a soldier's personal weapon, the weapon, or any other aimable device, may only by mounted/collocated with an optical unit 300' (including an imaging sensor) that is boresighted with the aimable device. The foregoing does not exclude the option of any weapon (including a soldier's personal weapon)/aimable device being mounted/collocated with the components that make up the optical unit discussed hereafter.

The optical unit 300' may have any or all of the components of the weapon mounted FCS 300 but may alternatively only, or at least, have an imaging sensor 324 and an interface 370/communication system 390. Preferably the optical unit 300' has a power source 380 as well as a mechanical interface 310. The operator receives imagery from the imaging sensor on the remote-control display and manually controls movement and firing of the weapon by controlling the weapon support 100 from the remote controller 200.

The aimable device/weapon W may or may not be mounted with a special sight. The same is true for all of the other optional components within the optical unit block which are indicated as being optional with a broken line boarder. Therefore, the optical unit may not perform any locking onto and/or tracking of targets.

According to one variation, the processing system 230 of the remote controller 200 may include all of the components of the FCS such that the remote controller provides any or all of at least the locking, tracking, and timed firing features ("assisted shot" features).

The adjustable support 100 includes at least two actuators to allow adjustment of the weapon aim direction in two angular degrees of freedom. The support is preferably a two-point support of the weapon may be combined with two linear actuators, forming what can be described as an active bipod, to adjust the alignment of the weapon relative to a second, fixed support point, which may be either closer to the front (firing direction) or the rear (butt) of the weapon. An arrangement in which both the front and the back of the weapon are supported by adjustable supports also falls within the scope of the invention. For example, both the front and back support points may be supported by an active bipod. Alternatively, in some cases, one support may provide a single horizontal adjustment while the other provides a single vertical adjustment, thereby providing a simpler mapping of actuator motion to pan (azimuth) and tilt (elevation).

For the purpose of one particularly-preferred but non-limiting example, the present invention will be illustrated herein in the context of a particularly lightweight, foldable and portable implementation employing a manually-adjustable front support which is fixed during operation and an active bipod rear support with two linear actuators. The support 100 is described in full detail with reference to FIGS. 2-6 below. At present it is sufficient to indicate that support 100 includes a power source 180 and a communications subsystem 190. The communications subsystem 190 of the support communicates with a corresponding communications subsystem 290 of the remote controller 200. Additionally, or alternatively, the FCS may include a communications subsystem 390, allowing communication directly between the FCS and the remote controller. The remote controller can be in electronic communication with the support (double-ended arrow 250) and/or with the FCS via wired means or wirelessly.

Remote controller 200 includes a processing system 230. The operator is able to remotely view the FOV of the imaging sensor of the FCS via a display 220. The display may be any display known in the art, but preferably a touch screen display. The touch screen display may double as a user input interface 240. Alternatively, or additionally, the remote controller console 200 includes functional buttons, switches and/or other input mechanisms which function as the user input interface 240. The remote controller 200 has an independent power source 280. Additionally, or alternatively, the controller may receive power from the support 100 or provide power to the support.

Figure 2:
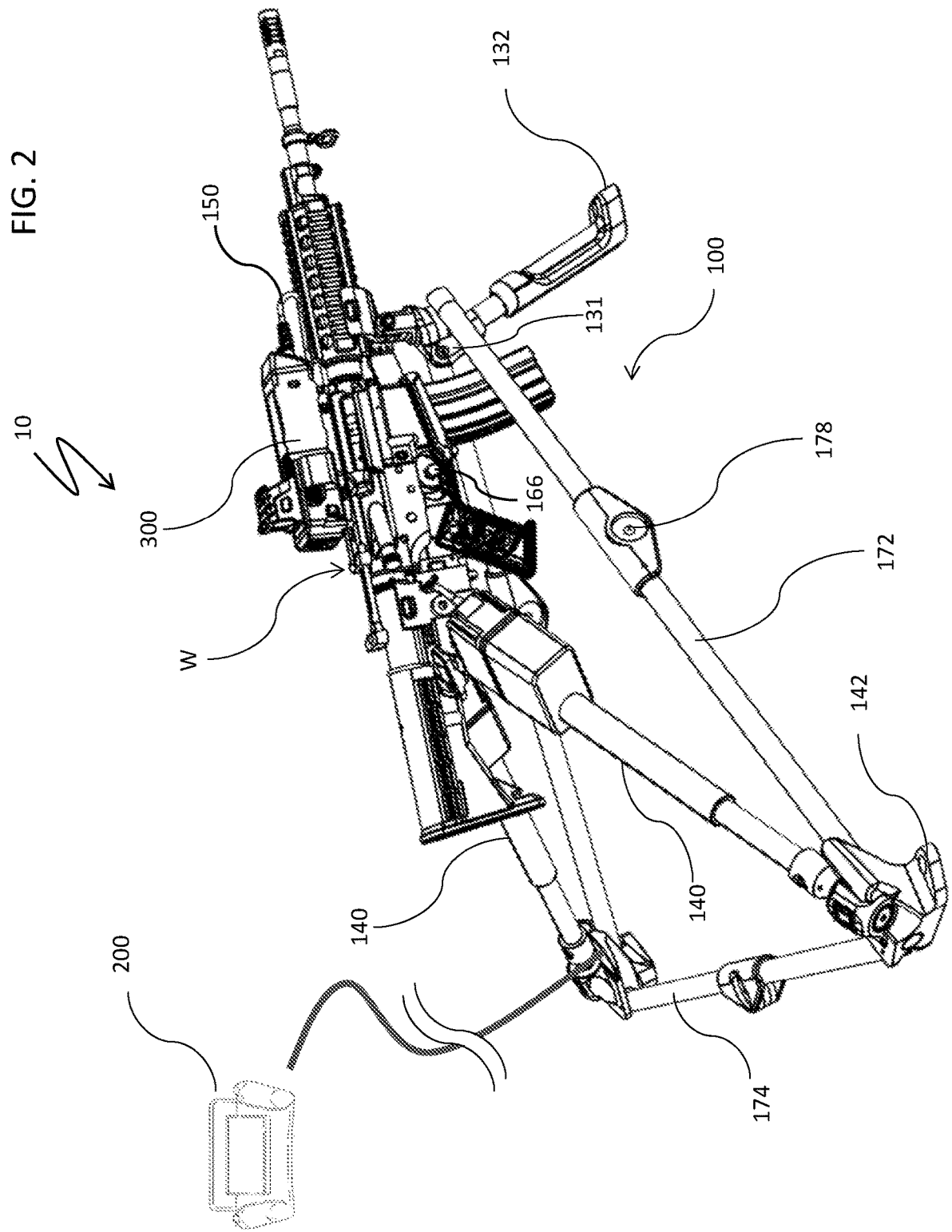
FIG. 2 is a right-side isometric view of a Remote-Controlled Weapons System.

FIG. 2 illustrates a right-side isometric view of a Remote-Controlled Weapons System 10 that includes a foldable, remotely controllable support 100 for a weapon W with a weapon mounted RCS 300 and a remote controller 200 according to the present innovation.

Figure 3A:
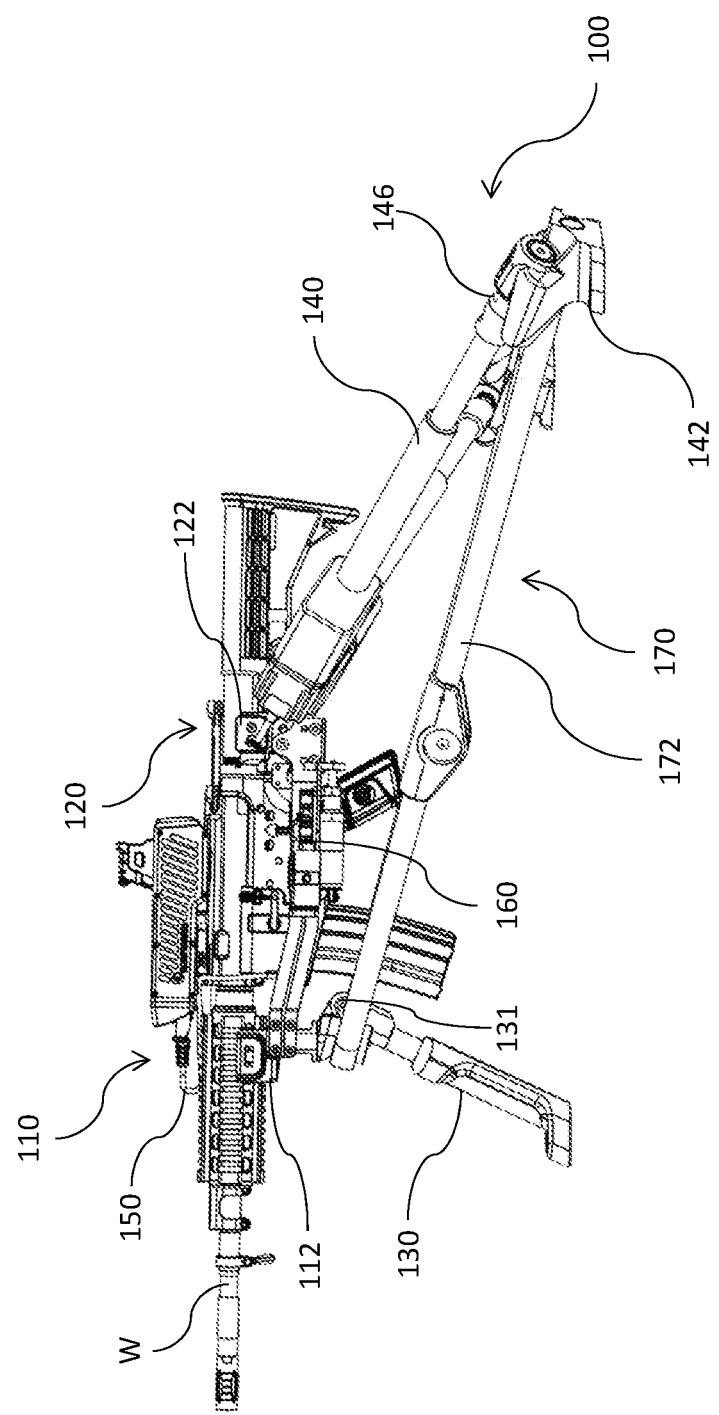
FIG. 3A is a left-side view of an embodiment of the innovative support.
Figure 3B:
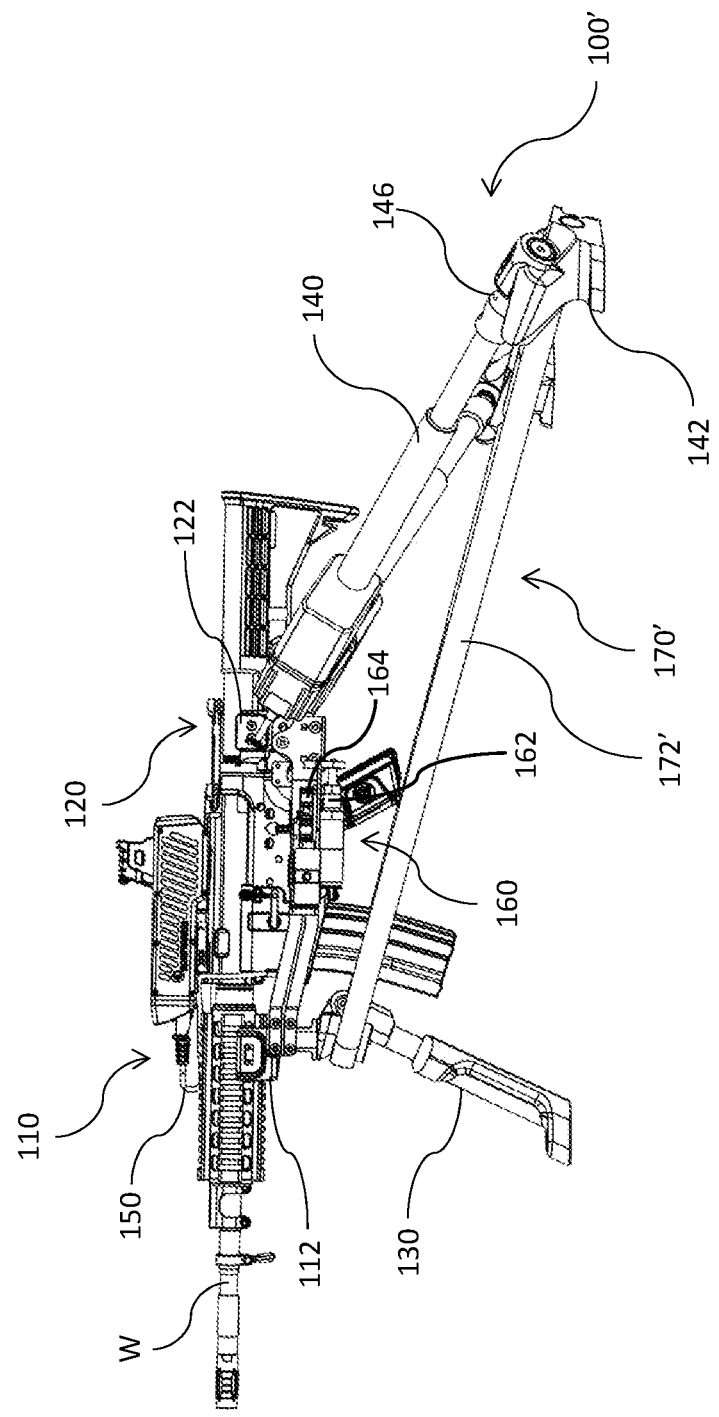
FIG. 3B is a left-side view of another embodiment of an RCWS, including an innovative support.

FIG. 3A is a left-side view of an embodiment of the innovative support 100. The foldable support is adapted to be a free-standing assembly upon which a firearm can be seated and secured in place. FIG. 3B is a left-side view of another embodiment of an RCWS, including an innovative support 100'.

Figure 4A:
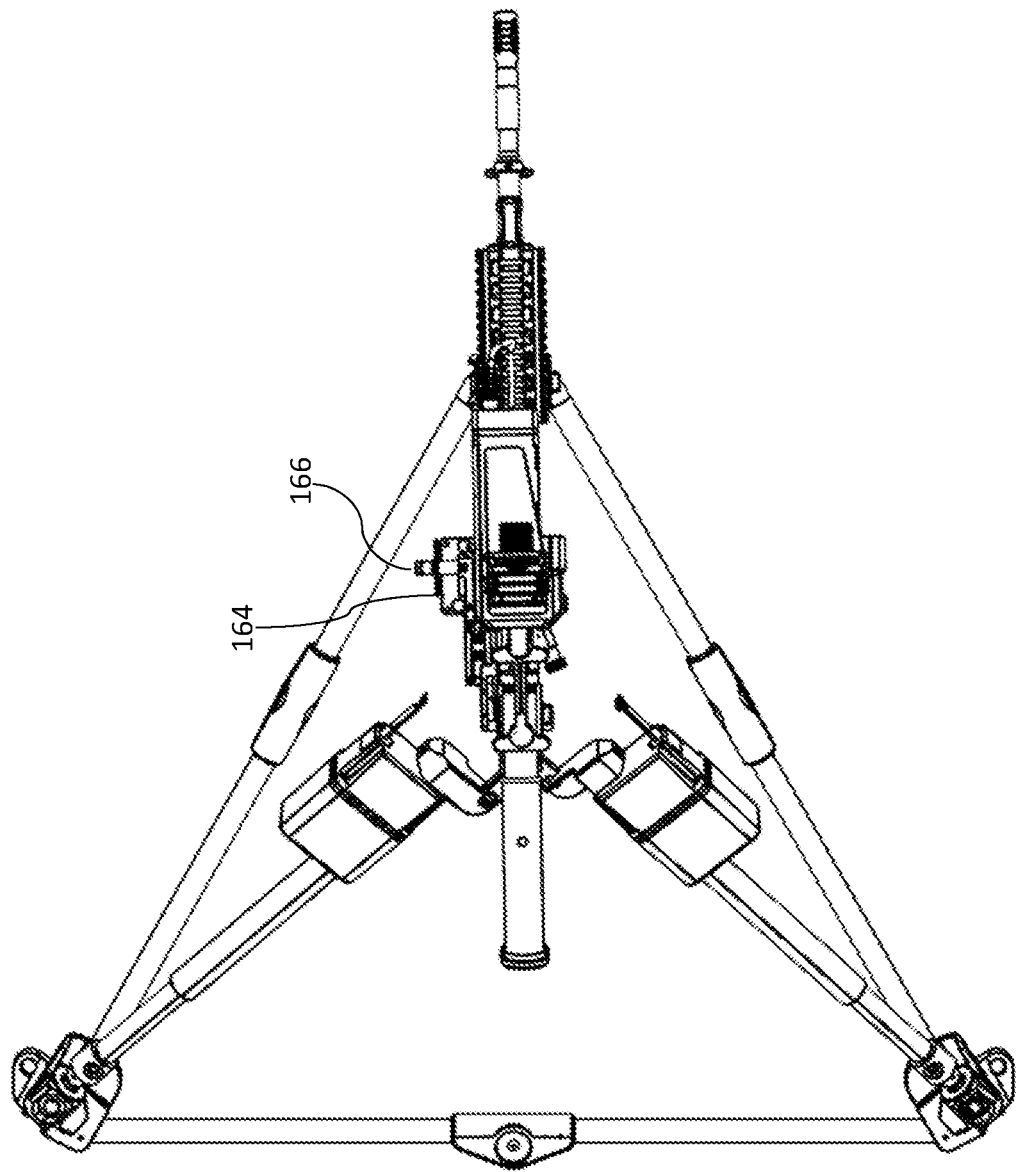
FIG. 4A is a top view of the support 100 with the weapon W secured to the support.
Figure 4B:
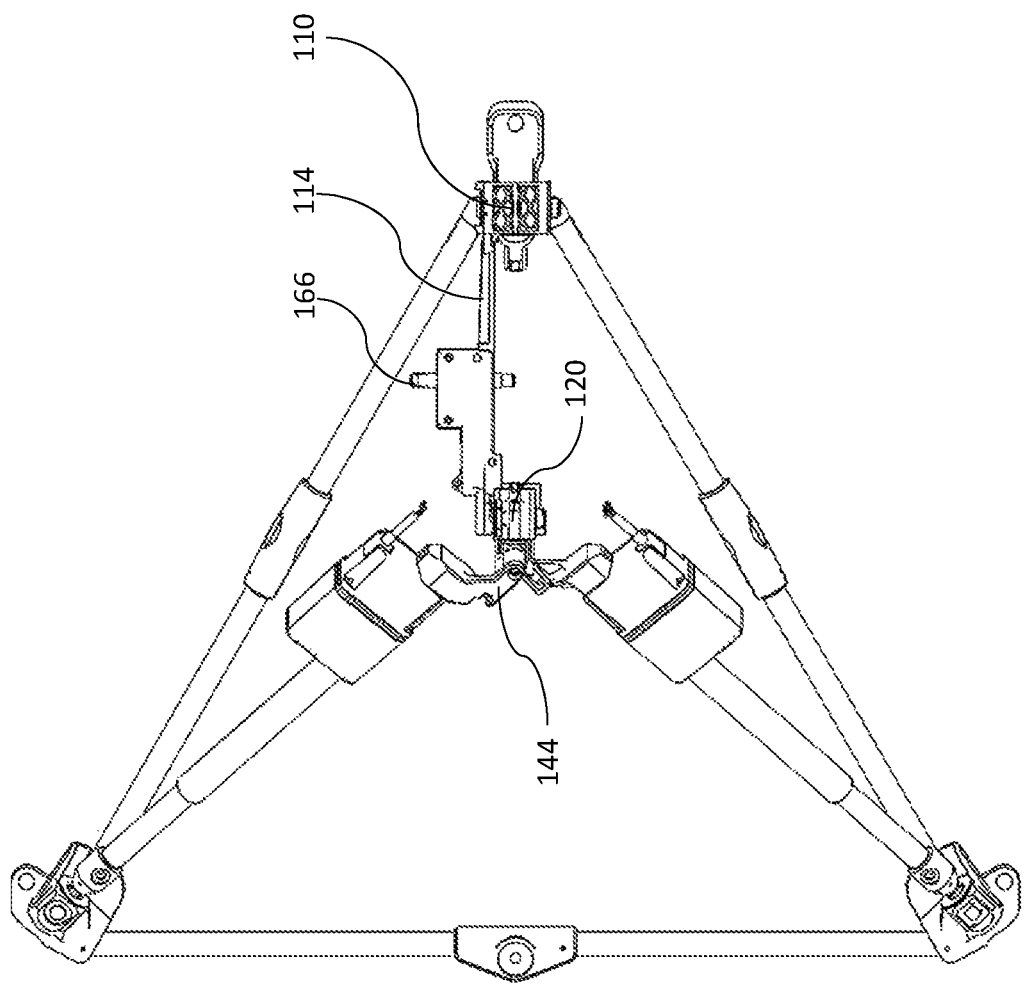
FIG. 4B is a top view of the support 100 without the weapon W secured to the support.
Figure 5A:
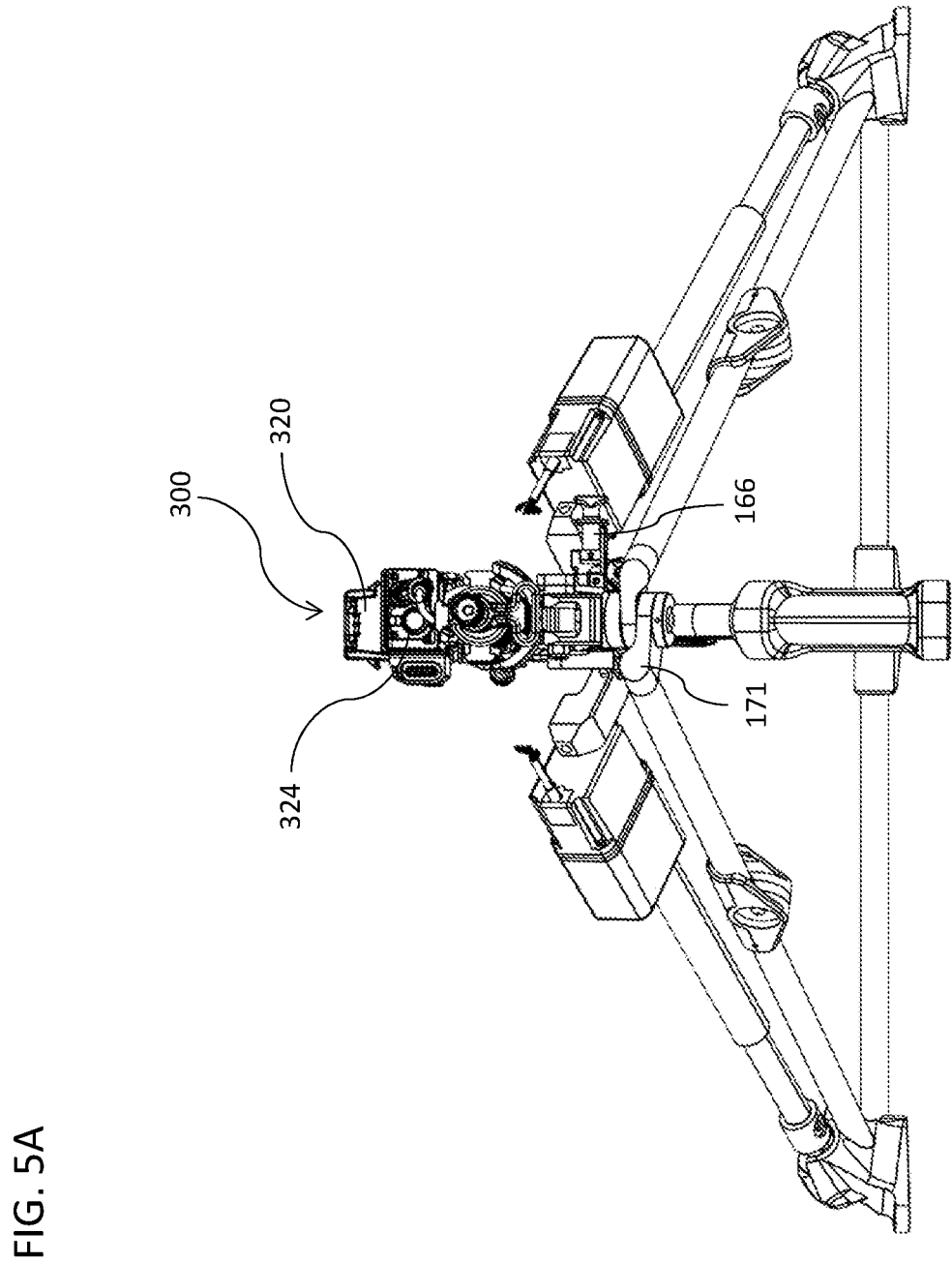
FIG. 5A is a front (barrel-end) view of support 100 with mounted weapon.
Figure 5B:
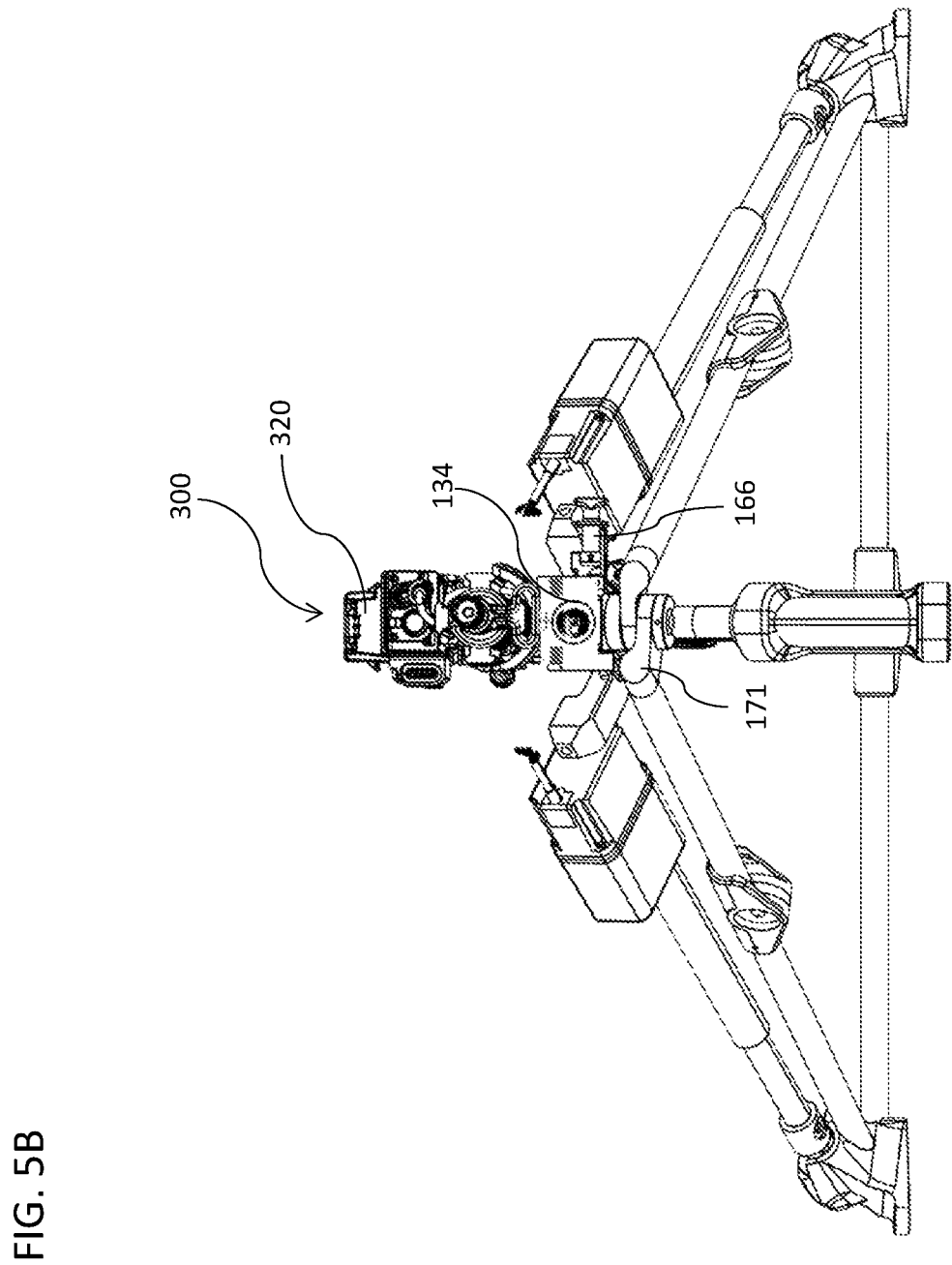
FIG. 5B is a front (barrel-end) view of another embodiment support 100 including a support camera.

FIG. 4A is a top view of the support 100 with the weapon W secured to the support. FIG. 4B is a top view of the support 100 without the weapon W secured to the support. FIG. 5A is a front (barrel-end) view of support 100 with mounted weapon W. FIG. 5B is a front (barrel-end) view of another embodiment support 100 including a support camera 134. According to some embodiments, the support or integrated camera is part of an integrated FCS.

FIGS. 6A, 6B and 6C depict various views the support of FIGS. 2-5 in a compact portable form. FIG. 6A is an isometric view of the support in the compact, portable form. FIG. 6B is side view of the same and FIG. 6C is a top view of the same.

The foldable support 100 includes a coupling arrangement adapted to releasably couple an aimable device to the support. In preferred embodiments, the coupling arrangement includes first 110 and second 120 weapon attachment configurations for engaging two spaced-apart locations on the weapon. Exemplarily, the weapon attachment configurations 110, 120 are adapted to receive thereon a first location of the weapon, such as a handguard of a barrel, and a second location of the weapon such as a shoulder stock. It is again made clear that the use of a weapon on the support is merely a specific example of an aimable device that can be releasably connected to the support.

FIGS. 7A-7D are schematic diagrams showing four configurations, without details of the collapsible frame and other components. FIG. 7A corresponds to the configuration shown, at least, in FIGS. 2-6. The two actuators 140 connect to the coupling arrangement on the stock end (i.e., where the stock end of the weapon is to be positioned) and foldable leg 130 connects to the coupling arrangement on the barrel end (i.e., where the barrel end of the weapon W is to be positioned). FIG. 7B shows an alternative configuration in which the foldable leg 130 connects to the coupling arrangement on the shoulder stock end, and two actuators 140 connect to the coupling on the barrel end. In a third configuration, shown in FIG. 7C, there are two actuators 140 that are located where the stock end of the weapon is to be rested and a forward actuator 140 (in place of a foldable leg) in the location supporting the barrel end of the weapon. These elements can also clearly be reversed, using an actuator in place of leg 130 of FIG. 7B. In the fourth configuration, depicted in FIG. 7D, there are four actuators 140. Two actuators connect to the coupling arrangement where the stock end of the weapon is to be positioned and another two actuators connect to the coupling arrangement where the barrel end of the weapon is to be positioned. Details of possible implementations of the configurations of FIGS. 7B-7D will be clear to a person ordinarily skilled in the art on the basis of the detailed example of the configurations of FIG. 7A given with reference to FIGS. 2-6 herein.

Referring again to the configuration depicted in FIGS. 2-6, the first weapon attachment configuration 110 is preferably coupled to the second weapon attachment configuration 120 via a bridge 114 (FIG. 4B) which maintains the desired spacing of the weapon attachment configurations, i.e., to avoid slipping of the attachment configurations along the weapon. In some embodiments, the second weapon attachment configuration 120 is slidably movable along bridge 114 to adapt the support for weapons of different lengths.

While the following description details the configuration shown in the figures, it is made clear that any arrangement for holding the weapon in place on the support is considered to be within the scope of the invention. Accordingly, the innovative system includes a collapsible support structure 105 and electromechanical actuators 140 for moving a mounted weapon W in elevation and azimuth. An aimable device such as a weapon can be releasably coupled to the support once erected, using any coupling arrangement or mechanism. The collapsible support structure includes, at least, a foldable leg and a collapsible reinforcement frame selectively providing rigid interconnection between the bases of each of the two linear actuators and the foldable leg. The support structure is collapsible to provide a compact portable form of the support. The two linear actuators are adapted to be angularly spaced apart and are axially coupled to the foldable leg. The linear actuators are adjustably coupled to the coupling arrangement.

The first and second weapon attachment configurations further include a means of securing the weapon in place on the support. An exemplary means 112, 122 for securing the weapon is a receptacle designed to rigidly hold the weapon in place, for example having a spring-loaded pin or similar appendage that tensions the weapon in place. Another example is a flexible rubber strap which is fixed to the support on one end and free on the other end. The strap is adapted to be stretched over the respective weapon location (e.g., stock or barrel) and pulled taut before the free end of the strap is secured to the support on the other side of the weapon, with the weapon trapped between the strap and the weapon attachment configuration.

To be clear, in the illustrated embodiment, the support 100 is adapted to receive the weapon such that the handle and magazine extend from the weapon towards the ground (or surface upon which the support is standing), the muzzle is in line with the front leg and the stock located between the two actuators. However, it is made clear that other configurations of the weapon support may be adapted to receive a weapon lying on its side or upside down.

The support illustrated here further includes at least one foldable leg 130 supporting the first weapon attachment configuration 110. According to the present configuration, depicted in the Figures, the foldable leg 130 supports the first weapon attachment configuration 110 which is adapted to receive the muzzle-end of the weapon W.

In some embodiments, the foldable leg 130 includes a selectable height mechanism 132 by which the foldable leg can be raised or lowered. (In some embodiments, this mechanism may be electro-mechanical, such as an actuator.) According to this embodiment, a foot 132 of the leg 130 is adapted to extend from the leg with one or more locking positions. For example, a lowest setting (i.e., the foot 132 is fully retracted into the leg 130) on the height mechanism can be selected when anticipated land-based targets such as combatants or vehicles. A higher setting (the foot 132 partially or completely extended out of the leg 130) can be selected when anticipating airborne targets such as drones. Another example is when the support is on an incline/decline and/or is aiming uphill/downhill.

A further optional feature is a camera (imaging sensor) 134 integrated in the foldable leg 130 and pointing in the same direction as the weapon W. Preferably, imaging sensor 134 is a wide-angle image sensor. The wide-angle image sensor is intended to supplement a narrow FOV sensor on the weapon (discussed elsewhere herein), for situational awareness and improved target acquisition. In some embodiments, the integrated image sensor 134 (hereafter 'support camera') can be used with a weapon-mounted laser for bore-sighting between the weapon camera and the support camera 134. Additionally, or alternatively, image processing techniques may be used to register the location of the narrow FOV image sensor mounted on the weapon within the wide FOV (W-FOV) images from support camera 134.

Alternatively, the support camera may be a different type of target detecting sensor, such as, but not limited to, LIDAR, RADAR, thermal imager, etc. According to some embodiments, support camera 134 is an image sensor with an additional sensor collocated with the camera 134. As a further option, the adjustable weapon support may be provided with a microphone for capturing sounds in the vicinity of the system and relaying them to the remote operator and/or for generating acoustically-triggered event warnings which are notified to the remote user for further investigation. As with all other aspects of processing performed by the present invention, the required processing for any of the above sensor types may be performed at any location, or split between multiple locations, including in the FCS, in a processing system of the adjustable weapon support, at the remote control interface, or in a remote network or using remote cloud computing resources.

The support 100 further includes two angularly-spaced linear actuators 140 supporting the second weapon attachment configuration 120. The actuators are angularly spaced when attached to the second weapon attachment configuration. Each actuator has a proximal end and a distal end. The proximal end is coupled to the second weapon attachment configuration 120 and the distal end is connected to a base 142 of actuator. The bases 142 are also coupled to, and form part of, the reinforcement frame 170 detailed below.

The distal ends of each of the actuators are coupled to a respective base 142 via a coupling 146. The depicted coupling is a ball in socket coupling, however, this is merely exemplary and not intended to be limiting. The coupling 146 may also have swivel capabilities. The coupling 146 allows the actuators to be arranged in the compact portable form depicted in FIGS. 6A-C after being disengaged from the second weapon attachment configuration. The actuators can be swiveled about the axes of the respective couplings to each lie parallel to a respective rigid support rod.

The proximal end of each actuator terminates in a coupling piece 144 which detachably attaches to a corresponding receiving piece on the second weapon attachment configuration 120. Preferably the coupling arrangement is a ball and socket arrangement. Accordingly, coupling piece 144 may be the ball component of the ball and socket arrangement or it may be the socket component. A ball and socket arrangement gives the apparatus a great deal of maneuverability. The linear movements of the linear actuators provide a limited pan (azimuth) capability as well as a tilt (elevation) capability. The first weapon attachment configuration 110 is attached to the foldable leg via a hinged and/or swivel coupling to facilitate the pan and/or tilt movement of the weapon while the foldable leg 130 remains stationary. The linear actuators 140 work in coordination to maneuver the weapon support. When a weapon is secured on the support, the linear actuators move (under control of the FCS, detailed elsewhere herein) to track a target, preferably for the purposes of firing on the target. The collapsible support structure 105 refers to the weapons attachment configurations, the bridge, the support frame, bases, the foldable leg and all the coupling pieces.

The linear actuators 140 may be implemented using any suitable technology. In one exemplary but non-limiting example, the linear actuators are screw actuators operated by small electric motors. In other exemplary but non-limiting examples, the linear actuators are hydraulic or pneumatic actuators.

In some embodiments, the linear actuators can be controlled remotely by an operator via a remote controller or "console" 200. The console 200 is in electrical communication with support 100 either via wired means 250 or wirelessly. The remote console 200 operator uses the weapon imaging sensor and/or the support camera 134 to visually locate a target on the display of the console (which corresponds to the FOV of the FCS imaging sensor, and in some cases to the FOV of the support camera) and select the target for tracking and firing. Once a target is selected and locked (a one- or two-step process), and the electrical command for firing has been provided, the FCS manipulates the support (i.e., provides output which controls the actuators that move the weapon) to track and fire on the target (once a firing solution is achieved) up to the limitation of movement of the support. This can be referred to as a lock-on-fire mode. In some embodiments, after selecting a target for tracking (this is referred to as a lock-on-track mode), it may be necessary to separately enter a firing command for the FCS to fire on the target (once a firing solution is achieved). Usually, there is also an "Arm" controller—to avoid shooting by mistake.

In some embodiments, in addition to the FCS controlling movement of the support to track and/or fire on the target, the console 200, e.g., a tablet or specialized remote control, can also directly control the movement of the support which is effected by the linear actuators. For example, the console operator can pan and/or tilt the weapon (by manipulating the actuators) in search of a potential target or a particular target that is not currently in the FOV of the weapon/support camera. Now that the weapon has been moved and a desired target is visible in the FOV of the weapon and/or the support camera, the operator transfer control of the support to the FCS as above.

In embodiments, the remote control may include additional features such as, but not limited to, directly controlling the firing mechanism ("direct mode"), controlling a cocking mechanism (where such a mechanism exists on the support/platform), enabling a non-lock-on mode (an optional feature of the weapon-mounted FCS) whereby the FCS initiates or enables firing at a moving object, recognized and/or identified as a target, remotely enabling an autonomous mode, etc.

Accordingly, the support can also function with a weapon-mounted FCS (as detailed elsewhere herein) or with weapon-mounted optics (with video) or even without a weapon attached thereto or any other similar configurations, for example, the support can simply function as a remote camera (i.e., using the integrated support camera 134), with the operator watching the live feed.

Alternatively, or additionally, another device, other than a firearm, may be mounted on the support. For example, a standard or high-resolution and/or far-sighted and/or thermal camera may be mounted on the support for surveillance purposes. The operator can watch and/or record and/or transmit the live feed to a distanced location as well as being able to pan the camera from side to side by controlling the actuators. Alternatively, a laser rangefinder (LRF), telescopic scope, spotter scope, and/or laser designator, and/or any aimable device can be mounted on the support.

The remotely controlled weapon support 100 is not only adapted to be mechanically coupled to the weapon W, but also electronically coupled to the Fire Control System (FCS) mounted on the weapon. The FCS on the weapon provides a layered approach including detection, tracking, calculating a firing solution and actuating the firing mechanism. Once the operator selects a target that is to be fired upon, the FCS tracks the target and moves the weapon to attain the firing solution and then fires the weapon. To be clear, once selection has occurred (see below for additional details), the FCS controls the support 100 and manipulates the actuators 140 to move the firearm W until the boresight intersects with the target (or where the target will be) and then the FCS actuates the firing mechanism.

A software module translates the left, right, up and down movements (instructions that come from the FCS and/or remote controller) into changes in the length of the actuators by extending and/or retracting the actuators to make the weapon move in the required direction. This software module may be part of the FCS and/or part of the support and/or the remote controller.

To clarify the aforementioned process, the FCS is discussed in greater detail. The instant support 100 is adapted to work integrally with an FCS. One exemplary FCS is the SMASH 2000 manufactured by Smart Shooter Ltd. (Kibbutz Yagur, Israel).

The SMASH 2000 sight includes, at least, an image sensor, a microcomputer and a micro display. The imagery is acquired by an image sensor and processed in real time by a microcomputer. This image processing allows the sight to detect and track stationary and moving targets, both on the ground and in the air.

The sight automatically and/or under user operation highlights, locks onto and tracks potential targets. The system also presents to the user a "firing zone", that represents aim correction that takes into account the necessary ballistics corrections, including target movement. SMASH 2000 sight module is an FCS by itself and can significantly improve operator fire accuracy.

The sight is mounted on a weapon and the operator wields the handheld weapon with the mounted sight in the field. The sight has multiple operational modes: a see-through reflex sight (red-dot) for rapid fire; a day mode for fire control assisted shots using see-through projected markers; and a night mode for fire control assisted shots using video display. In both Day and Night modes (see-through and video modes), the symbols of 'locked' target, 'firing zone' and other symbols are superimposed on top of the view of the real world. The sight includes a micro display on which the symbols are displayed in such a way that they augment the view of the real world.

The difference between Night mode and Day mode is that in Night mode, the real world is shown to the user via video projection on the same micro display since the image sensor of the system is much more sensitive than the human eye. In the Day mode, the real-world scene is visible through the see-through optics while the markings are projected onto the scene by the micro display.

The full SMASH 2000 FCS, also includes a Fire Control Mechanism (FCM), that, in most cases, replaces the original grip of an assault rifle, and is connected to the sight module.

The objective of the FCM is to allow an "assisted shot" mode by timing the bullet discharge on a locked target to a moment when the hit probability is high, and by that to minimize the differential effect of the individual shooter (resulting from factors such as stress, fatigue and shooting skills). This timing is provided to FCM by the sight module that performs the necessary calculations based on locked target parameters, user stability, range and more. Working in tandem, sight and FCM modules allow the user to achieve the highest hit rate.

Referring back to the innovative system of instant disclosure, the instant support 100 replaces the human operator who aims the firearm and depresses the trigger. The weapon mounted sight/FCS 300 (which has the same or similar detecting, tracking and in some embodiments the fire actuation capabilities as the exemplary SMASH 2000 unit) is electronically connected to the support 100 via a cable 150. A controller/interface 152 on the support 100 centralizes the actuator controls, the trigger-pulling mechanism controls and the camera controls and data transfer. The controller/interface serves as a gateway for commands from the sight and/or console which control the various mechanisms and components of the support through the controller.

The operator of the remote-control console 200 selects/locks onto one of the detected potential targets in the FOV of the sight and the FCS controls the actuators to move the firearm such that the boresight of the firearm intersects with the target (in the real world) and the projected digital barrel indicator (red-dot, reticle, crosshairs etc.) intersects with the projected target area marker (on the see-through display of the sight). The FCS computes the exact moment to fire the bullet so that the target will be hit. The operator obviously only sees a video image in the remote controller display.

The illustrated support 100 includes a trigger-pulling mechanism/structure 160. The trigger-pulling mechanism can be considered a specific embodiment of an actuation mechanism. Where relevant, the actuation mechanism works together with the Fire Control Mechanism (FCM) which is discussed above. The FCM can be seen as an extension of the FCS. By contrast, the actuation mechanism (such as the trigger pulling mechanism) is a component of the support. The actuation mechanism may come in different forms for different aimable devices or there may be more than one actuation mechanism for increased versatility (e.g., a trigger pulling mechanism as well as a button pushing mechanism, etc.). However, for the sake of clarity, this mechanism will only be referred to herein as a trigger-pulling mechanism.

The trigger-pulling mechanism 160 can be seen from various angles in FIGS. 2-5B. The mechanism includes an actuator mechanism 162 and spring-loaded actuator arm 164. A displaceable shaft 166 is coupled to the actuator arm. The shaft 166 is inserted into the trigger guard when the weapon is mounted on the support. The shaft engages the trigger when actuated. In the exemplary embodiments depicted in the Figures, the actuator mechanism 162 is a linear actuator mechanism that moves the arm backwards on command, pulling the shaft against the trigger to actuate firing of the weapon. Shaft 166 can be seen in FIG. 2 as well as in FIGS. 4A and 4B. In FIGS. 4A and 4B the shaft is in a first position outside of the trigger area. The shaft can be moved inside the trigger area once the weapon is secured onto the support structure 100. It is made clear that any relevant actuation mechanism can be used in place of, or in addition to, the aforementioned, exemplary embodiment.

There are two potential manners of actuating the firing mechanism: in collaboration with a FCM and independent of any FCM. The first manner is the same as the manner in which a human operator fires a weapon that has a modified grip with an integrated FCM. That is to say that the once a target has been locked onto and the command to fire has been given (if these two steps are separate, which they may or may not be), all via the remote console 200, the actuator engages and depresses the trigger while the FCM prevents the trigger from being actuated. All the while the FCS is actively moving the firearm to try and acquire a firing solution on the locked-on target. As soon as the FCS determines that the target will be hit, the FCM allows actuation of the trigger and the trigger-pulling mechanism is able to complete the trigger pulling action to fire the weapon.

In the second manner of firing the weapon, the FCS instructs the trigger-pulling mechanism 160 to pull the trigger when the processing system determines that the target will be hit. According to the exemplary implementation of the trigger pulling mechanism depicted in FIG. 5, when the FCS instructs the trigger-pulling mechanism 160 to fire, the linear actuator 162 moves the actuator arm 164 towards the butt of the weapon such that the paddle squeezes the trigger and causes the weapon to fire.

The first manner of implementation can only be employed with a firearm that has a modified grip with an integrated FCM. However, the second manner can be employed regardless of whether the grip is standard or modified. The second manner of implementation makes the instant support device more versatile in that it can be used with most firearms that has the appropriate dimensions and a weapon-mounted FCS.

The preceding discussion is relevant to a weapon with a trigger that is manipulated (pulled) to effect firing. However, it is made clear that the depicted mechanism is merely exemplary and that the trigger pulling mechanism is a term intended to include any relevant mechanism that actuates a firing control of a weapon, where the trigger pulling mechanism is adapted to correspond to the manner of actuation of the firing control (e.g., pushing a button).

However, not all aimable devices that can be mounted on the support have a trigger. Some devices may have some other mechanical actuator for activating the aimable device. Some devices may alternatively, or additionally, be activated via a signal that can be delivered from a remote device. In these latter devices, the trigger pulling mechanism (or equivalent thereof) may be redundant or may not be part of the apparatus.

In embodiments with an integrated camera in the support, i.e., support camera 134, the support camera is preferably a wide-angle camera. As mentioned elsewhere, there may be one or more additional sensors (LIDAR, RADAR, etc.) that can sense a target in other modalities. In some embodiments, one of these additional sensors may detect a potential target whereby the support camera (and/or the weapon-mounted imaging sensor) can be redirected to detect and/or track the potential target.

In certain particularly preferred embodiments, selection of the target causes the support 100 to move the weapon W to track and fire on the target. In some embodiments, the operator can manually move the support (i.e., control the actuators 140). In some embodiments, the operator can manually fire the firearm.

The support 100 may have its own power source 180 such as a rechargeable battery or may draw power for the actuators (and support camera, if used) from the rechargeable battery of the FCS or vice versa. When the remote control is connected to the support in a wired manner it can draw power from the from the battery of the support or the FCS.

The support 100 further includes a collapsible reinforcement frame/support structure 170. The frame 170 is collapsible to provide a compact portable form of the support. FIG. 4 depicts the foldable support 100 in the compact portable form. Reinforcement frame 170 includes two foldable, angularly spaced apart supporting rods 172, and a third, foldable cross member 174. The supporting rods 172 and cross member 174 form an isosceles triangle with the supporting rods converging to a point and the cross member 174 forming a base of the triangle. The reinforcement frame 170 is adapted for selectively providing rigid interconnection between bases 142 of each of the two linear actuators 140 and the first weapon attachment configuration 110/foldable leg 130.

To be more precise, the first weapon attachment configuration is operationally coupled to a post (having a substantially vertical axis) in a manner which allows freedom of movement of the first weapon attachment configuration relative to the stationary foldable leg 130. Each of the two rods 172 of the reinforcement frame is axially coupled to the post by a respective swivel arrangement 171 which allows the rod to swivel horizontally about the post to lie parallel to the other rod 172 or to be angularly spaced apart from the other rod.

Each supporting member 172 is made up of two parts hingedly coupled together by a folding hinge 178 disposed between the two parts. The two-part supporting rod 172 has an extended state and a folded state whereby one part of the supporting member swivels approximately 180° about hinge 178 to lie flat against the other part of the supporting member.

The foldable cross member 174 is disposed between bases 142. The foldable member includes a hinge 176 disposed at the midpoint of the cross member 174. When the cross member is unfolded and locked open, the supporting rods are angularly spaced apart. When the cross member is folded closed, the supporting rods lie next to each other. The angle of elevation of the supporting rods 172 is smaller than the angle of elevation of the actuators 140 when connected to the second weapon attachment configuration.

Another embodiment of the foldable frame is shown in FIG. 3B. FIG. 3B depicts a modified support 100' wherein each of the foldable supporting rods 172 is substituted with a non-folding supporting member 172'. All the other components are the same as those found in the support 100. The substitution of the supporting rods 172 with the non-folding supporting members 172' lengthens the overall length of the apparatus when in the compact, portable form of the support 100' relative to the overall length of the support 100 in the compact, portable form. As such, this second embodiment is less preferable.

The foldable leg 130 is connected to the bottom of the post, via a hinged connector 131. To collapse the support 100, actuators 140 are disconnected from the second weapon attachment configuration, cross member 174 is moved from the open, locked state to a closed state, bringing the bases 142 and supporting rods 172 together. Foldable leg 130 is folded about a horizontal axis to lie against the supporting rods. In the embodiment depicted in FIG. 3A, the supporting rods are folded about the hinges 178. In the embodiment depicted in FIG. 3B, this folding step is obviously not relevant.

To assemble the support, the process is reversed: The foldable leg is unfolded, and (where relevant) the foldable support rods 172 are unfolded. The cross member 174 is spread open and locked open; the actuators are connected to the second weapon attachment configuration and the support is now ready to receive the weapon.

It is made clear that while the depicted configurations are preferred, they are not intended to be limiting. Any configurations and/or mechanisms that facilitate the conversion of the support structure from the open state to the portable, collapsed state are considered to be within the scope of the present innovation.

The versatility of the support is such that a soldier can set up the support 100 and then attach his or her personal weapon (e.g., an M4 rifle mounted with an FCS sight) onto the support. The personal weapon can now be remotely controlled by the soldier or another individual.

The weapon W is seated on the first and second weapon attachment configurations and secured in place by securing means. The shaft 166 of the trigger-pulling mechanism 160 is inserted in the trigger guard. The support controller is electronically coupled to the FCS sight by plugging cable 150 into a dedicated communication (and in some cases power) port on the sight module. The FCS 300 is turned on and the console 200 activated. The system is now ready for action. Similar processes and steps are employed, mutatis mutandis, for assembling and disassembling each of the embodiments discussed herein.

According to another configuration, the foldable leg 130 supports the first weapon attachment configuration 110 which is adapted to receive the stock-end of the weapon W while the second weapon attachment configuration is adapted to seat the barrel of the weapon W such that the muzzle is located between the actuators and the stock is supported by the foldable leg. In this configuration, the trigger-pulling mechanism is located near the first weapon attachment configuration, with the actuator arm and paddle extending away from the foldable leg side of the support and towards the linear actuators side of the support. Other than the aforementioned changes and some other minor modifications, mutatis mutandis, the instant configuration is very similar to the original configuration.

In yet another configuration, the aimable device is permanently mounted on the support. According to such a configuration, the collapsible remote-controlled support system includes an aimable device permanently (e.g., by welding) mounted on an adjustable support. The body of the adjustable support includes a foldable leg, two linear actuators and a collapsible reinforcement frame. The foldable leg is coupled to a first location on the aimable device. The two linear actuators are adapted to be angularly spaced apart and are adjustably coupled to a second location on the aimable device. The collapsible reinforcement frame selectively provides rigid interconnection between bases of each of the two linear actuators and the foldable leg. The reinforcement frame is collapsible to alternatively provide a compact portable form of the support system.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A foldable support for aiming an aimable device, the support comprising:
   (a) a coupling arrangement adapted to releasably couple the aimable device thereto;
   (b) a foldable leg mechanically coupled to said coupling arrangement;
   (c) two linear actuators adapted to be angularly spaced apart, said two linear actuators adjustably coupled to said coupling arrangement; and
   (d) a collapsible reinforcement frame selectively providing rigid interconnection between bases of each of the two linear actuators and said foldable leg, and collapsible to provide a compact portable form of the support.

2. The support of claim 1, wherein said collapsible reinforcement frame includes two rods each running from a respective base of each of said two linear actuators to said folding leg, said two rods being axially coupled to said foldable leg.

3. The support claim 2, wherein each of said two rods includes a respective hinge for folding said two rods to provide said compact portable form.

4. The support of claim 1, wherein the aimable device is mounted on the support and wherein the aimable device is suitable for both handheld and mounted operation without modification to the aimable device between said handheld and said mounted operation.

5. The support of claim 1, further comprising an actuation mechanism for actuating the aimable device.

6. The support of claim 5, wherein the aimable device is a weapon and said weapon is mounted on the support and wherein said actuation mechanism is a trigger pulling device.

7. The support of claim 6, wherein said trigger-pulling device is configured to be actuated according to output from a fire control system mounted on said weapon.

8. The support of claim 5, wherein the aimable device includes or is mounted with an imaging sensor and wherein the support is in communication with a remote controller and wherein said actuation mechanism is configured to be remotely actuated by said remote controller.

9. The support of claim 5, wherein said actuation mechanism is adapted to be actuated according to output from a fire control system collocated with the aimable device.

10. The support of claim 9, wherein the support is in communication with a remote controller and wherein said actuation mechanism is configured to be remotely actuated based on commands from said remote controller.

11. The support of claim 10, wherein said actuation mechanism is selectively controlled according to a mode selected from the group including:
    (i) a direct mode based on output from said remote controller to said actuation mechanism immediately actuates said actuation mechanism,
    (ii) a lock-on-fire mode wherein said output from said remote controller instructs said fire control system to lock onto a selected target and actuate said actuation mechanism when a firing solution is achieved,
    (iii) a lock-on-track mode wherein said output from said remote controller instructs said fire control system to lock onto a selected target and actuate said actuation mechanism when a subsequent firing command has been received and said firing solution has been achieved, and
    (iv) an autonomous mode wherein said output from said fire control system autonomously controls said actuation mechanism.

12. The support of claim 1, wherein said linear actuators are adapted to be actuated according to output from a remote controller in communication with the support.

13. The support of claim 1, wherein the aimable device is mounted on the support and wherein said linear actuators are adapted to be actuated according to output from a fire control system collocated with the aimable device and in communication with said linear actuators.

14. The support of claim 13, wherein said linear actuators are adapted to be selectively actuated according to said output from at least one of: said fire control system and a remote controller in communication with the support.

15. The support of claim 1, further comprising an integrated image sensor in the support.

16. The support of claim 1, wherein said coupling arrangement includes first and second attachment configurations for engaging two spaced-apart locations on the aimable device.

17. The support of claim 1, wherein said folding leg includes is a third linear actuator.

18. The support of claim 17, further including a fourth linear actuator, wherein said two actuators are adjustably coupled to a first location on said coupling arrangement and said third and fourth linear actuators are adjustably coupled to a second location on said coupling arrangement.

19. The support of claim 1, further comprising a fire control system integrated in the support.

20. A collapsible support system, comprising:
   an aimable device;
   a foldable leg is coupled to a first location on said aimable device;
   two linear actuators adapted to be angularly spaced apart and adjustably coupled to a second location on said aimable device; and
   a collapsible reinforcement frame selectively providing rigid interconnection between bases of each of the two linear actuators and said foldable leg, and collapsible to provide a compact portable form of the support system.

* * * * *